3,203,960
METHOD OF PREPARING HALOGENATED DERIVATIVES OF ACETYLENE-DIUREINE AND ITS SUBSTITUTION PRODUCTS
Louis Gandon, Petit-Quevilly, and Paul Henri Williame, Asnieres, France, assignors to Nobel-Bozel, Paris, France, a joint-stock company of France
No Drawing. Filed Apr. 9, 1963, Ser. No. 271,583
Claims priority, application France, Oct. 29, 1962, 913,801
5 Claims. (Cl. 260—309.7)

The present invention relates to the preparation of halogenated derivatives from acetylene diureine or its substitution products. It is particularly concerned with the preparation of derivatives containing at least one halogen selected from the group comprising chlorine and bromine; more especially it relates to the preparation of a tetrahalo-acetylene-diureine.

Another purpose of the invention is to provide a process for producing tetrachloro-acetylene-diureine.

In the preparation of these compounds, it has been essential up to the present time to carry out the halogenation of the acetylene-diureine and its substitution derivatives in the presence of compounds having a neutralizing action in respect of the hydrogen halide formed during the reaction. These neutralizing compounds include, for example, alkaline carbonates, alkaline bicarbonates, hydroxides of alkali metals, sodium borate, silicates of alkali metals, and the like.

The characteristic reactions were therefore of the following type, taking, by way of illustration, the example of chlorination:

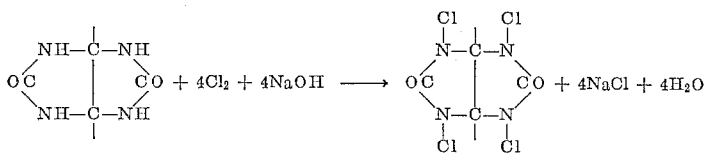

with caustic soda as the neutralizing agent;

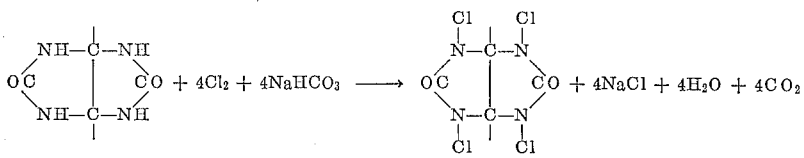

with sodium bicarbonate as the neutralizing agent; etc.

The method of the present invention makes it possible for the first time to carry out on an industrial scale the following type of reaction:

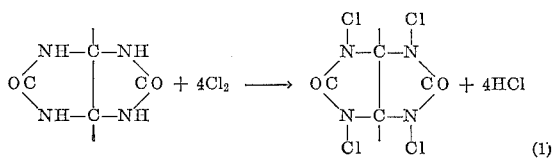

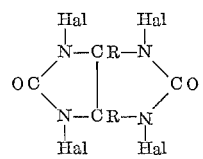 (1)

The invention more particularly relates to the preparation of a substituted or non-substituted tetrahalo-acetylene-diureine having a chemical constitution approximating to the formula:

$$\begin{array}{c} \text{Hal} \quad \text{Hal} \\ \text{N—CR—N} \\ OC \qquad \qquad CO \\ \text{N—CR—N} \\ \text{Hal} \quad \text{Hal} \end{array}$$

wherein Hal is a halogen of the group of chlorine and bromine and R is selected from the group of monovalent aliphatic and aromatic organic radicals, by halogenating, with stirring, the acetylene-diureine reactant placed in aqueous suspension, the method being characterized first of all in that the halogenating step is carried out in an acidic medium without any neutralizing agent.

By following the specifications of the present invention, the said reaction is not only capable of being carried out industrially, but practically quantitative halogenation yields can be obtained.

The concentration of the reagents must be restricted to between certain limits.

For the convenience of definition, the concentration of the reactants will be calculated in percentages by weight of hydrogen halide, in accordance with the following rule given, by way of illustration, in the case of chlorination:

$n$ grams of acetylene-diureine being put in suspension in $p$ grams of water, there is obtained theoretically, according to the reaction (1) above:

$$\frac{146}{142} \times n \text{ grams}$$

of HCl, which corresponds in percentage weight of HCl to a final theoretical concentration of:

$$100 \times \frac{\frac{146}{142} \times n}{\frac{146}{142} \times n + p}$$

This will be known herein as the "calculated concentration of HCl."

The concentration of the reactants being defined according to this rule, for carrying out the method of the invention it is necesary that the concentration of the reactants should be such that with an assumed theoretical halogenation, the final concentration of hydrogen halide is less than 18–19% but is preferably higher than 2–3%, the preferred concentration being from 10 to 14%. On the other hand, the stirring must be sufficiently vigorous for the whole of the halogen introduced to be wholly absorbed by the reaction medium at any moment of the reaction.

Furthermore, the operation must be preferably carried out rapidly. The introduction of the gaseous halogen will be regulaed, for example, to a rate such that a halogenation of from 94 to 97% is obtained in from one to several hours, preferably in from 1 to 2 hours.

In addition, the introduction of the gaseous halogen will be regulated to a constant rate, at least up to the moment when a halogenation of from 94 to 97% has been reached.

Furthermore, operation of the method is very simple. Taking into account the indications given above with respect to the concentration of the reactants, the stirring and the manner in which the halogen is introduced, the method of procedure can be summarized as follows:

The halogen is introduced into the aqueous suspension of the acetylene-diureine reactant, the control being constituted for example by a layer of liquid such as concentrated sulphuric acid.

When a halogenation of from 94 to 97% has been reached, the gaseous halogen introduced will no longer be retained quantitatively; this can be observed for example by the commencement of gas bubbling in the control flask.

The introduction of gaseous halogen is then stopped and the solid halogenated product obtained is separated and then washed and dried, its elementary analysis indicating a chemical constitution fairly close to that of a pure tetrahalo-acetylene-diureine.

Although the product obtained is not a chemically pure tetrahalo-acetylene-diureine, it can be employed for all the known uses of this type of compound, for example as a fungicide, an antibaceterial agent, a bleaching agent etc.

Prior to the method of the present invention, those skilled in the art considered it to be impossible to obtain an industrial result by the halogenation of acetylene-diureine and its substituted derivatives in the absence of neutralizing products, since it was assumed that in the presence of free hydrogen halide the reaction product decomposed. Such is the case with chlorination of acetylene-diureine.

The present invention teaches, on the contrary, that reaction in an acidic medium is technically possible; on the other hand, in order to achieve this, specific conditions must be observed.

The technical progress represented by the present invention is considerable. On the one hand it will henceforth be possible to work in the absence of any neutralizing product, which represents an important simplification as compared with known methods. On the other hand all the characteristic conditions of the present method result, in practice, in a considerable reduction in the duration of the operations, which represents an equally important step forward in technical progress.

In order to make the invention more clearly understood, some examples of its execution will be given below, by way of indication but not in any limitative sense, with respect to acetylene diureine and the manufacture of tetrachlore-acetylene-diureine, the same operations applying to the manufacture of corresponding chlorinated derivatives from substituted derivatives of acetylene diureine, or to the manufacture of tetrabromo-acetylene-diureine and its aliphatic- and aromatic-substituted derivatives.

*Example 1*

1 kg. of acetylene-diureine is placed in suspension in 16,100 ml. of water (which corresponds to a concentration in "calculated HCl" of 6%).

Into this suspension is introduced chlorine, while stirring very vigorously, maintaining a constant rate of 960 grams of chlorine per hour, the control being constituted by a layer of concentrated sulphuric acid of 3 cm. in height.

At the end of 120 minutes chlorine begins to bubble in the control flask. The introduction of chlorine is then stopped and the solid product obtained is separated, after which it is washed with water until the hydrochloric acid is eliminated. Finally the product is dried, for example under vacuum, at 60–70° C.

The quantity of chlorine absorbed is $$\frac{960}{60} \times 120 = 1{,}920 \text{ grams}$$

or 96% of the theoretical quantity (2,000 grams).

The chlorinated product collected weighs 1,910 grams after washing and drying; its chlorine content is 49.7% (chlorine content of the tetrachloro-acetylene-diureine: 50.6%).

*Example 2*

1 kg. of acetylene-diureine is placed in suspension in 9,250 ml. of water (which corresponds to a concentration in "calculated HCl" of 10%).

Chlorine is introduced into this suspension, while stirring very vigorously, maintaining a constant rate of 1,200 grams of chlorine per hour, the control being constituted by a layer of concentrated sulphuric acid of 3 cm. in height.

At the end of 97 minutes, chlorine begins to bubble in the control flask. The introduction of chlorine is then stopped and the solid product obtained is separated, after which it is washed with water and dried.

The quantity of chlorine absorbed is $$\frac{1200}{60} \times 97 = 1{,}940 \text{ grams}$$

or 97% of the theoretical quantity (2,000 grams).

The chlorinated product collected weights 1,930 grams after washing and drying; its content in chlorine is 50.0%.

*Example 3*

1 kg. of acetylene-diureine is placed in suspension in 6,300 ml. of water (which corresponds to a concentration in "calculated HCl" of 14%).

Into this suspension is introduced chlorine, while stirring very vigorously, maintaining a constant rate of 2,000 grams of chlorine per hour, the control being constituted by a layer of concentrated sulphuric acid of 3 cm. in height.

At the end of 58 minutes, chlorine begins to bubble in the control flask. The introduction of chlorine is then stopped and the solid product obtained is separated, after which it is washed with water and dried.

The quantity of chlorine absorbed is $$\frac{2{,}000}{60} \times 58 = 1{,}933 \text{ grams}$$

or 96.6% of the theoretical quantity (2,000 grams).

After washing and drying, the chlorine content of the chlorinated product collected is 49.9%.

Repeating the process of Examples 1, 2 and 3, but replacing acetylene-diureine by a substituted acetylene-diureine, corresponding tetrachloro derivatives can be obtained. Thus, with 1,5-dimethyl-acetylene-diureine, 1,5-diphenyl-acetylene-diureine and 1-methyl-5-phenyl-acetylene-diureine as starting materials, 1,5-dimethyl-2,4,6,8-tetrachloro-acetylene-diureine, 1,5-diphenyl - 2,4,6,8-tetrachloro-acetylene-diureine and 1-methyl-5-phenyl-2,4,6,8-tetrachloro-acetylene-diureine are obtained respectively. The corresponding tetrabromo derivatives are also obtained by substituting bromine for chlorine in the process.

We claim.

1. A process, comprising the steps of:
  (a) suspending in water a compound of the acetylene diurene class selected from the group consisting of acetylene diureine; 1,5 - dimethyl-acetylene-diureine; 1,5-diphenyl-acetylene-diureine; and 1-methyl-5-phenyl-acetylene-diureine;
  (b) vigorously stirring the aqueous suspension;
  (c) introducing a gaseous halogen selected from the group consisting of chlorine and bromine into the said stirred aqueous suspension in an amount to form a final calculated concentration of hydrogen halide by the reaction in the reaction medium of greater than 2% by weight with respect to the weight of the reaction medium but lower than 19% by weight of the said medium;
  (d) maintaining the introduction of said gaseous halogen over a reaction period of from 1 to 2 hours to obtain a halogenation yield of 94 to 97%;
  (e) maintaining said vigorous stirring during said reaction period so that esentially the total gaseous halogen introduced is integrally absorbed by the reaction medium during the entire time period; and (f) separating the filtrate from the reaction mixture of the solid halogenated derivative formed, corresponding to a member selected from the group consisting of
   tetrachloro-acetylene-diureine;
   tetrabromo-acetylene-diureine;
   1,5-dimethyl-2,4,6,8-tetrachloro-acetylene-diureine;
   1,5-dimethyl - 2,4,6,8 - tetrabromo-acetylene-diureine;
   1,5-diphenyl - 2,4,6,8 - tetrachloro-acetylene-diureine;
   1,5-diphenyl - 2,4,6,8 - tetrabromo-acetylene-diureine;
   1-methyl-5-phenyl - 2,4,6,8 - tetrachloro-acetylene-diureine; and
   1-methyl-5-phenyl - 2,4,6,8 - tetrabromo-acetylene-diureine.

2. A process according to claim 1 wherein the gaseous halogen is continuously introduced until the gaseous halogen is emitted from the reaction medium.

3. A process in accordance with claim 1 wherein said amount of gaseous halogen introduced will form a final calculated concentration of hydrogen halide between 10 and 14% by weight.

4. A process according to claim 1 wherein the product produced is tetrachloro-acetylene diureine.

5. A process according to claim 4 wherein the precipitated tetrachloro-acetylene-diureine is washed with water until the hydrochloric acid is eliminated and then dried.

References Cited by the Examiner

UNITED STATES PATENTS 2,777,856  1/57  Stokes _____ 260—309.7
3,029,236  4/62  Staeuble et al. _____ 260—249.5

FOREIGN PATENTS

Bergmann: The Chemistry of Acetylene and Related Compounds, page 80, New York, Interscience, 1948.

Morton: The Chemistry of Heterocyclic Compounds, p. VI of the preface, New York, McGraw-Hill, 1946.

German application No. 1,020,024, Steinbrink et al., printed Nov. 28, 1957.

WALTER A. MODANCE, *Primary Examiner.*

NICHOLAS S. RIZZO, *Examiner.*